(12) United States Patent
Sun

(10) Patent No.: US 7,149,366 B1
(45) Date of Patent: Dec. 12, 2006

(54) HIGH-DEFINITION HYPERSPECTRAL IMAGING SYSTEM

(75) Inventor: Xiuhong Sun, North Andover, MA (US)

(73) Assignee: Flight Landata, Inc., North Andover, MA (US)

(*) Notice: Subject to any disclaimer, the term of this patent is extended or adjusted under 35 U.S.C. 154(b) by 819 days.

(21) Appl. No.: 10/241,371

(22) Filed: Sep. 11, 2002

Related U.S. Application Data

(60) Provisional application No. 60/318,742, filed on Sep. 12, 2001.

(51) Int. Cl.
  *G06K 9/36* (2006.01)
  *H04N 7/18* (2006.01)
  *G01J 3/28* (2006.01)

(52) U.S. Cl. ........................ 382/284; 348/144

(58) Field of Classification Search ................ 382/276, 382/277, 284, 285; 348/143, 144, 147, 229, 348/272, 296; 342/195; 359/285; 701/3; 358/501, 504, 505, 530; 356/301, 328, 417; 250/221, 226, 334, 339.07
See application file for complete search history.

(56) References Cited

U.S. PATENT DOCUMENTS

| | | | |
|---|---|---|---|
| 5,790,188 A | 8/1998 | Sun | 348/144 |
| 6,008,492 A * | 12/1999 | Slater et al. | 250/334 |
| 6,211,906 B1 | 4/2001 | Sun | 348/144 |
| 6,490,075 B1 * | 12/2002 | Scheps et al. | 359/285 |
| 6,495,818 B1 * | 12/2002 | Mao | 250/226 |
| 6,694,064 B1 * | 2/2004 | Benkelman | 382/284 |
| 6,831,688 B1 * | 12/2004 | Lareau et al. | 348/272 |
| 6,958,466 B1 * | 10/2005 | Stein | 250/221 |
| 2003/0130767 A1 * | 7/2003 | Carroll | 701/3 |
| 2005/0104771 A1 * | 5/2005 | Terry et al. | 342/195 |
| 2006/0050278 A1 * | 3/2006 | Treado et al. | 356/417 |

OTHER PUBLICATIONS

"Computerized Airborne Multicamera Imaging System", authors Xiuhong Sun, James Baker and Richard Hordon, Presented 2nd International Airborne Remote Sensing Conf. and Exhibition, San Francisco, CA, Jun. 24-27, 1996, pp. III-803 to III-812.
"Computerized Airborne Multicamera Imaging System (CAMIS) and Its Four-Camera Applications*", authors Xiuhong Sun, James Baker and Richard Hordon, Presented at 3rd International Airborne Remote Sensing Conference and Exhibition, Jul. 7-10, 1997, Copenhagen, Denmark, pp. II-799 to II-806.

* cited by examiner

*Primary Examiner*—Amir Alavi
(74) *Attorney, Agent, or Firm*—John H. Pearson, Jr., Esq.; Walter F. Dawson, Esq.; Pearson & Pearson, LLP.

(57) ABSTRACT

A compact high-definition hyperspectral imaging system (HDHIS) for light aircraft remote sensing to perform concurrent pushbroom hyperspectral imaging and high-resolution photographic imaging. The HDHIS comprises a sensor head having a hyperspectral scanner and a CCD digital camera. An airborne computer interfaces with the sensor head to provide data acquisition including hyperspectral quick view images and control functions. An alternative embodiment includes combining the HDHIS with a computerized airborne multi-camera imaging system (CAMIS) which comprises four progressive scan (CCD) cameras attached to a set of interchangeable, interference filters, to provide a triple spectral imaging system that can be operated by one person on a light aircraft.

37 Claims, 14 Drawing Sheets

HIGH-DEFINITION HYPERSPECTRAL IMAGING SYSTEM

CROSS-REFERENCE TO RELATED APPLICATIONS

This is a nonprovisional patent application claiming priority of provisional application for patent Ser. No. 60/318,742, filed Sep. 12, 2001.

BACKGROUND OF THE INVENTION

1. Field of the Invention

This invention relates to a spectral imaging system for light aircraft remote sensing and in particular to a high-definition hyperspectral imaging system (HDHIS) that integrates a grating based imaging spectrometer and a CCD digital camera for concurrent pushbroom hyperspectral imaging and high resolution photographic imaging.

2. Description of Related Art

There are increasing concerns about the environmental change of our earth and the effective management of human activities altering and using our planet. Modern terrestrial remote sensing, featuring digital spectral image data collection technologies, has been increasingly used for quickly and efficiently mapping, imaging and monitoring our planet earth from global scale to regional. The first commercial 1-meter resolution satellite, US Space Imaging's Ikonos, was successfully launched in August 1999, joining the Landset, Spot, and other operational Earth observation satellites and providing 1-meter-resolution photographs of almost any place on earth. Aerial remote sensing platforms are indispensable and valuable adjuncts to the latest Earth observation satellites. New generations of smaller, lighter, power saving, cheaper and better hyperspectral/multispectral imaging systems are becoming operational to fly with diverse low-cost flying platforms in traditional light aircraft, balloons and airships to the latest unmanned aerial vehicles (UAVs). Quickly available higher spatial and spectral resolution airborne spectral images with extended dynamic range are broadly desired for regional, special and satellite-demanded ground truth remote sensing applications.

In U.S. Pat. No. 5,790,188 issued to Xiuhong Sun on Aug. 4, 1998 and assigned to Flight Landata, Inc. of Lawrence, Mass., a variable interference filter imaging spectrometer (VIFIS) system is described which acquires ground track spectral images from air or space with a two-dimensional field of view and generates spectral imagery from three channels of synchronized video outputs. The synchronized video stream outputting from each camera is fed to a control and interface unit where a composite analog signal is formed from the individual output video signals for recording on an analog video recorder. A digital signal is also generated for recording on a computer disk. Control of the shutter speed of each of 3 cameras is provided.

In U.S. Pat. No. 6,211,906 issued to Xiuhong Sun on Apr. 3, 2001 and assigned to Flight Landata, Inc. of Lawrence, Mass., a computerized component, variable interference imaging spectrometer ($C_2VIFIS$) is described for airborne remote sensing and data acquisition with a two dimensional field of view. Spectrally filtered video data is obtained from three synchronized CCD-imager modules or cameras wherein one imager module has a visible range variable interference filter on its surface, a second imager module has a near-infrared variable interference filter on its surface, and a third imager module has a bandpass filter attached to the imager. An alternating staring/scanning method is used to optimize a pushbroom hyperspectral image data set with a photogrammetric reference.

A computerized airborne multicamera imaging system (CAMIS) is described in a paper by Xiuhong Sun, James Baker and Richard Hordon entitled "Computerized Airborne Multicamera Imaging System" (CAMIS), Second International Airborne Remote Sensing Conference and Exhibition, San Francisco, Calif., 22–27 Jun. 1996. The CAMIS comprises a personal computer such as a Pentium 133 MHz computer which receives data from three synchronized CCD cameras with interchangeable narrow-band interference filters and a variable interference filter. Simultaneous, digital multichannel images are directly recorded onto SCSI drives without compression.

An improved computerized airborne multicamera imaging system (CAMIS) with four camera integration for remote sensing is described in a paper by Xiuhong Sun, James Baker and Richard Hordon entitled "Computerized Airborne Multicamera Imaging System (CAMIS) and Its Four-Camera Application", Third International Airborne Remote Sensing Conference and Exhibition, 7–10 Jul. 1997, Copenhagen, Denmark. This improved CAMIS is a direct-sensor-to-computer imaging system which has integrated real-time positioning, a live moving map, and a live composite image display window for four cameras into a compact personal computer running under Windows NT. This paper also shows that a sequence of four channel CAMIS snapshots can be composed and mosaiked as a natural/NIR color composite pair with larger coverage, in which spectral characteristics beyond human eyes become easily recognized because of the large scale aerial multispectral viewing.

SUMMARY OF THE INVENTION

Accordingly, it is therefore an object of this invention to provide a high-definition hyperspectral imaging system (HDHIS) in compact form for use in a small aircraft to perform concurrent high-resolution photographic imaging and pushbroom hyperspectral imaging to acquire seamless fused airborne imagery data sets for optimized spatial, spectral and radiometric measurement performance.

It is another object of this invention to combine an HDHIS with a computerized airborne multi-camera imaging system (CAMIS) to provide a hyperspectral/multispectral/photographic triple imaging system that can be operated by one person in a light aircraft.

It is a further object of this invention to provide simultaneous airborne triple imaging with well-balanced hyperspectral, multispectral and digital-photographic imagery by a single operator using light aircraft.

These and other objects are accomplished by an imaging system comprising means for providing hyperspectral images of a target area, means positioned adjacent to the hyperspectral images providing means for providing photographic images of the target area, and means for processing the images from the hyperspectral images providing means and the photographic images providing means to produce optimized spatial and spectral aerial images of the target area. The means for providing hyperspectral images comprises a hyperspectral scanner for acquiring images of the target area line after line as a pushbroom-sequence. The hyperspectral scanner comprises a spectrograph, a lens attached to an input of the spectrograph, and a CCD camera attached to an output of the spectrograph. The means for processing the images comprises a computer coupled to a removable hard drive. The computer comprises means for providing power and control with optimized wiring to the hyperspectral images providing means and to the photographic images providing means. The photographic images providing means comprises a CCD digital camera. The computer provides the hyperspectral images and the photographic images to the removable hard drive. Also, the computer comprises means for ring buffering data of the hyperspectral images and transferring the data to the removable hard drive with significantly extended recording capacity.

The objects are further accomplished by an airborne imaging system comprising a hyperspectral scanner, a digital camera positioned adjacent to the hyperspectral scanner, and means for processing imaging data from the hyperspectral scanner and the digital camera for displaying and storing concurrent hyperspectral images and high resolution photographic images. The means for processing the imaging data comprises a computer coupled to a removable hard drive.

The objects are further accomplished by a multi-sensing imaging system comprising means for providing hyperspectral images of a target area, means positioned near and optically parallel to the hyperspectral images providing means for providing photographic images of the target area, means positioned near and in parallel with the hyperspectral images providing means and the photographic images providing means for providing multispectral images of the target area, and means for processing the images from the hyperspectral images providing means, the photographic images providing means, and the multispectral images providing means. The multi-sensing imaging system comprises a removable hard drive for storing the images received from the processing means. The means for providing hyperspectral images comprises a hyperspectral scanner for acquiring images of the target area line after line as a pushbroom-sequence. The hyperspectral scanner comprises a spectrograph, a lens attached to an input of the spectrograph, and a CCD camera attached to an output of the spectrograph. The photographic images providing means comprises a high-definition CCD digital camera. The means for providing the multispectral images comprises four multispectral cameras each including interchangeable interference filters. The processing means comprises a first computer for processing images of the target area from the hyperspectral images providing means and the photographic images providing means of the target area, and the processing means comprises a second computer for processing images of the target area from the multispectral images providing means. The system comprises means connected between the first computer and the second computer for controlling the processing of the images by a single operator. The system comprises a removable hard drive connected to the first computer. The first computer transfers the hyperspectral images, the photographic images, and the multispectral images via the second computer to the removable hard drive. The system comprises a data communication link between the first computer and the second computer for transferring the multispectral images. The first computer comprises means for ring buffering data of the hyperspectral images and transferring the data to a removable hard drive.

The objects are further accomplished by a method of providing an airborne imaging system comprising the steps of providing a hyperspectral scanner for generating hyperspectral images, providing a digital camera positioned adjacent to the hyperspectral scanner for generating photographic images, and processing imaging data from the hyperspectral scanner and the digital camera for display and storage of the hyperspectral images and the photographic images. The step of providing a hyperspectral scanner comprises the steps of providing a spectrograph, attaching a lens to an input of the spectrograph, and attaching a CCD camera to an output of the spectrograph. The step of processing imaging data from the hyperspectral scanner and the digital camera comprises the step of providing a computer coupled to a removable hard drive. The step of providing a computer coupled to a removable hard drive comprises the step of providing means for ring buffering of data from the hyperspectral scanner and transferring the data to the removable hard drive.

The objects are further accomplished by a method of providing a multi-imaging system comprising the steps of providing a hyperspectral scanner for viewing a target area and generating hyperspectral images, providing a digital camera, positioned near and optically parallel to the hyperspectral scanner, for generating photographic images of the target area, providing a plurality of multispectral cameras, positioned near and in parallel with the hyperspectral scanner and the digital camera for generating multispectral images of the target area, processing the hyperspectral images from the hyperspectral scanner and photographic images from the digital camera with a first computer connected to outputs of the hyperspectral scanner and the digital camera, processing the multispectral images with a second computer connected to outputs of the multispectral cameras, connecting a data link between the first computer and the second computer for transferring the multispectral images, and connecting a control link between the first computer and the second computer for controlling the collection and processing of the images from the hyperspectral scanner, the digital camera and the multispectral cameras. The method comprises the step of providing a removable hard drive coupled to the first computer. The step of connecting the control link between the first computer and the second computer includes the step of operating the multi-imaging system by a single operator. The step of providing a hyperspectral scanner comprises the step of providing a spectrograph, attaching a lens to an input of the spectrograph, and attaching a CCD camera to an output of the spectrograph. The step of providing the first computer comprises the step of providing means for buffering data from the hyperspectral scanner and transferring the data to a removable hard drive.

Additional objects, features and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
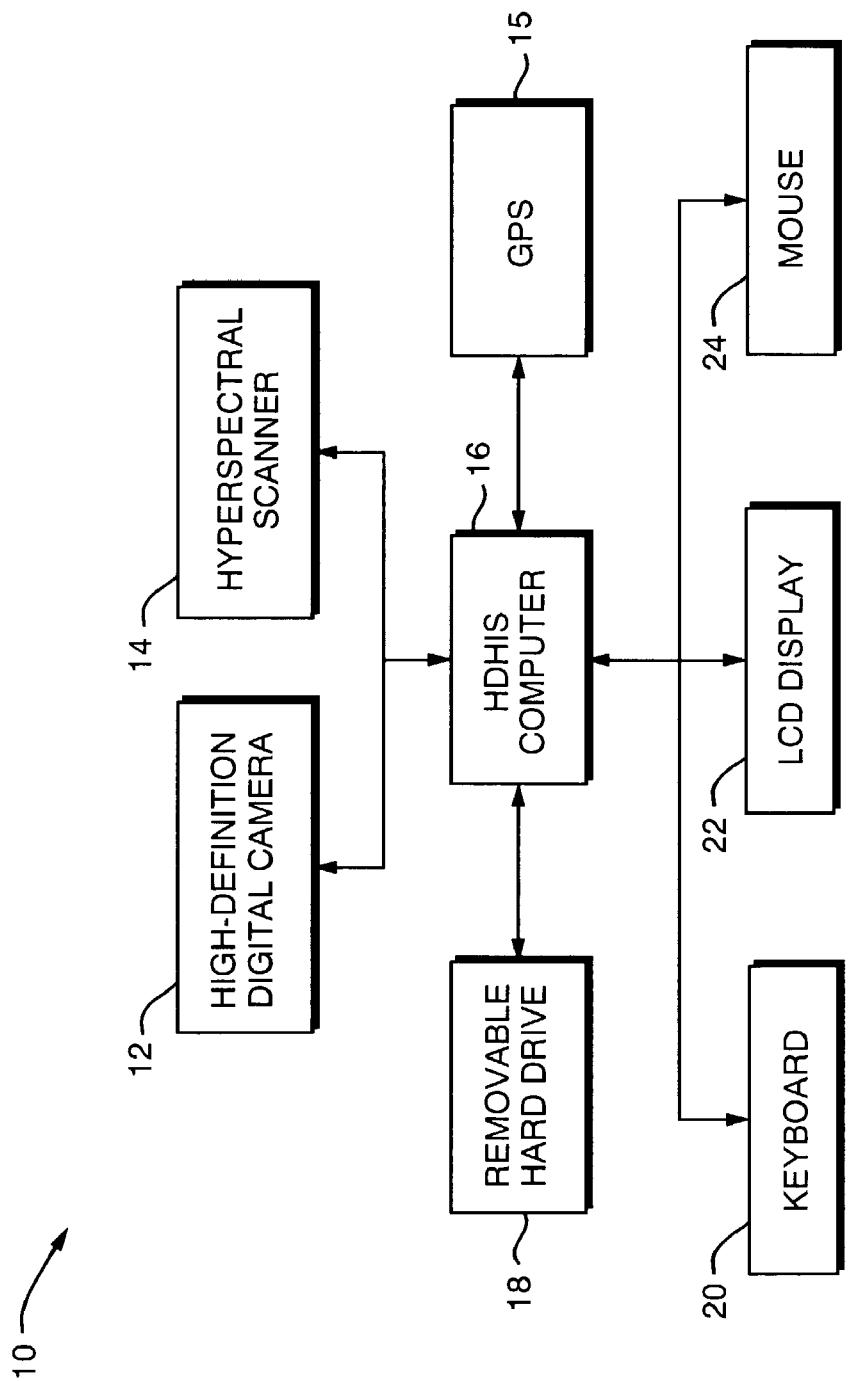
FIG. 1 is a block diagram of a High-Definition Hyperspectral Imaging System (HDHIS) according to the present invention.

Referring to FIG. 1, a block diagram is shown of a high-definition hyperspectral imaging system (HDHIS) 10 for use in light aircraft to perform remote sensing. The HDHIS uses a multi-sensing approach that integrates a grating based imaging spectrometer or hyperspectral scanner 14 and a CCD digital camera 12 for concurrent pushbroom hyperspectral imaging and high-resolution photographic imaging. The HDHIS 10 comprises an HDHIS computer 16 for data acquisition and a removable hard drive 18 for sensor data storage and fast data delivery. An operator communicates with the computer via a keyboard 20, LCD display 22 and mouse 24.

The HDHIS 10 performs concurrent high-resolution photographic imaging and pushbroom hyperspectral imaging to acquire seamlessly fused airborne imaging data sets for optimized spatial, spectral, and radiometric measurement performance. The HDHIS 10 integrates the compact pushbroom-scan grating imaging spectrometer (hyperspectral scanner) 14 for simultaneous pixel spectrum measurement in the complete Visible and Near Infrared (VNIR) and expandable to Short Wave Infrared (SWIR) range with a spectral resolution better than 5 nm and a swath width better than 320 pixels, the 2000×1312 pixel high-resolution measurement-grade photographic CCD digital camera 12, the compact PC based airborne computer 16 with built-in data acquisition components (for imaging and GPS 15), and removable hard drive 18 for mass storage into a turnkey system. The objective goal of this concurrent complementary imaging is to incorporate information from both the precision-georeferenced, instantaneous-freeze-frame color photographic image from the CCD camera 12, which has a much-higher achievable spatial resolution (up to 64-times higher in this embodiment) for instantaneous large area imaging, and the pushbroom-scanned, high-spectral-resolution data set from the hyperspectral scanner 14, which covers the VNIR range with 240 bands with a better than 5 nm spectral resolution, but a coarse spatial resolution, thereby increasing the remote sensing performance over that achieved by any single imaging mode. In addition, by fusing the instantaneous area imaging and instantaneous pixel spectra measurement, the overall fidelity and reliability of the acquired data is improved and the data volume for typical applications is optimized.

Figure 2:
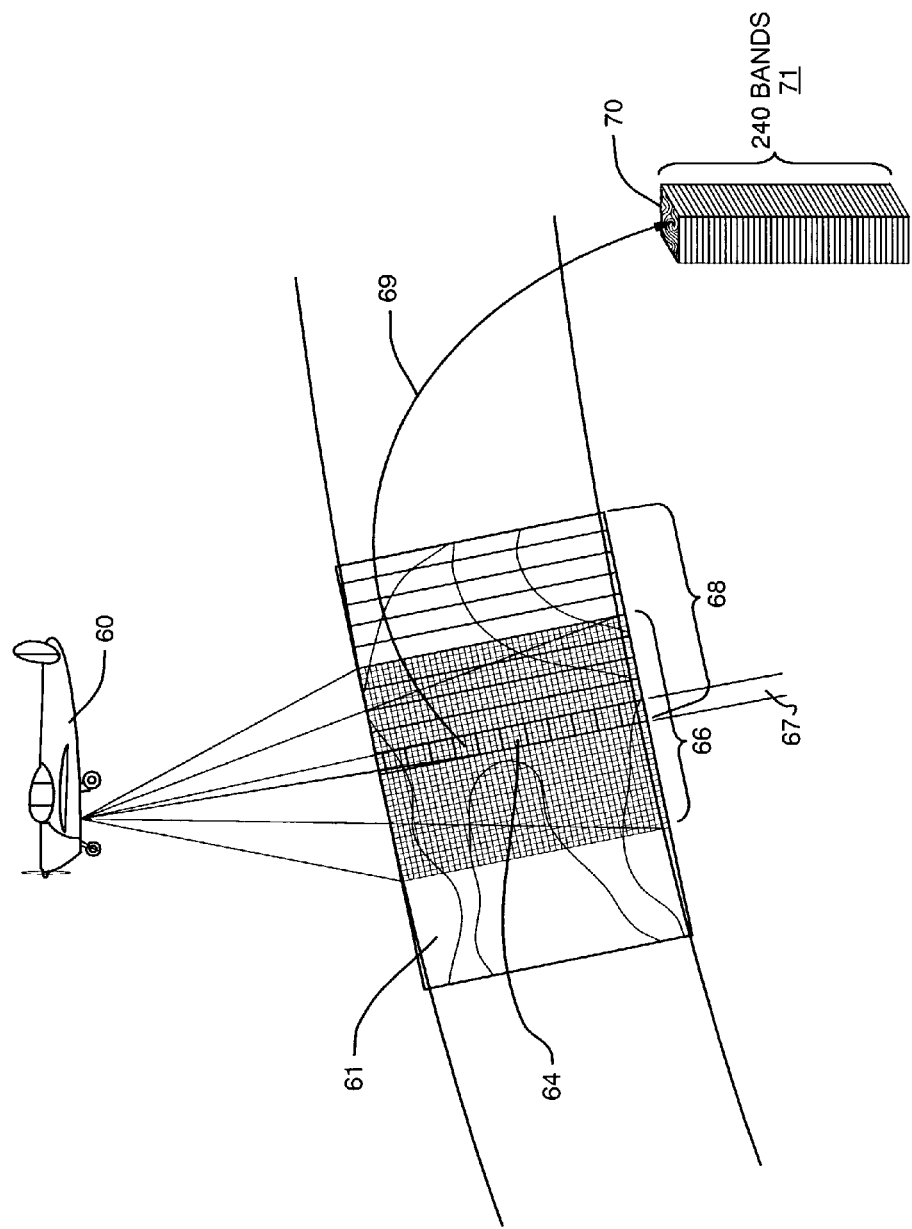
FIG. 2 is a pictorial view of a compact HDHIS in a light aircraft obtaining photographic imaging and pushbroom-scan hyperspectral imaging with seamless data fusion at the measurement level.

Referring to FIG. 1 and FIG. 2, FIG. 2 is a pictorial view of the HDHIS 10 located within a light aircraft 60 flying over a landscape 61. The HDHIS 10 obtains via the digital camera 12 image with 2000×1312 pixels 66 and has a finer spatial resolution. The digital camera 12 provides freeze-frame photographic images 66. The hyperspectral scanner 14 acquires images line after line as a pushbroom-sequence 68 for pixel spectral signatures in 445–905 nm range (extendable to 2500 nm in the future). Pixel spectrum stack 70 is extracted (illustrated by pixel 69 extraction) from a pixel in a scan line 67 of the hyperspectral scanner 14 of HDHIS 10 and stored in the hard drive 18; hence, the hyperspectral scanner 14 captures images with a spectrum associated with each pixel 64, 69, but has a coarser spatial resolution than that of the digital camera 12. The stack 70 shows a column of pixel data simultaneously acquired by HDHIS 10. The different layers of the stack 70 depict different bands. In the present embodiment of HDHIS 10 there are a total of 240 bands distributed from 445 to 905 nm. The area covered by the stack 70, (which represents a pixel of the hyperspectral scanner), is also covered by a small image obtained by the HD camera 12 (as shown on the top of the stack 70). With a spatial resolution of the HD camera 12, more spatial details over a hyperspectral pixel 69 are revealed indicating how the pixel spectrums of stack 70 are averaged, e.g. averaged by a uniform target or different things. This spatial information is very important for sub-pixel analysis of the hyperspectral data.

Figure 3:
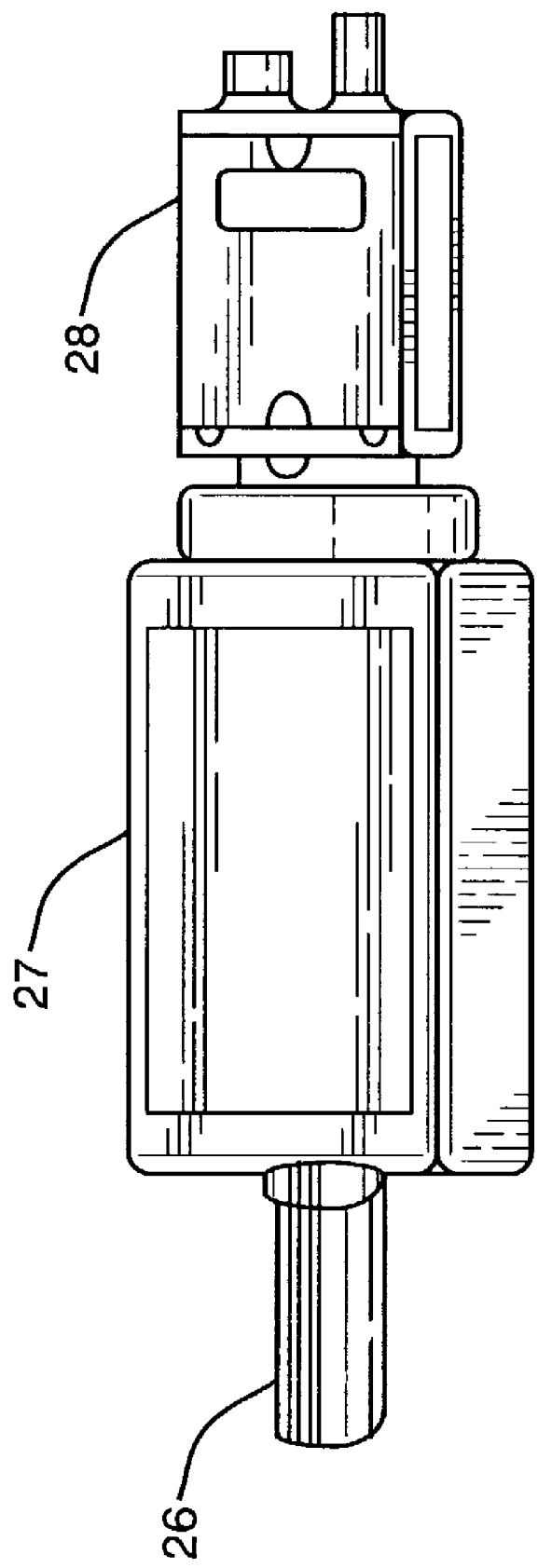
FIG. 3 is a perspective side view of the hyperspectral scanner.

Referring to FIG. 3, a perspective side view of the hyperspectral scanner or imager 14 is shown comprising a front lens 26 having a standard interchangeable C-mount, a spectrograph 27, and a ⅔ inch black/white CCD camera 28. The lens 26 is a ⅔ inch format 16 mm f/1.4 which is embodied by Model C1614A (C31630) manufactured by Cosmican/Pentax of Japan. The spectrograph 27 is embodied by Model ImSpector V9 manufactured by Specim Ltd. of Oulu, Finland. The specifications for the hyperspectral scanner 14 are listed in Table 1.

TABLE 1

| Operation mode: | Pushbroom Scanning |
|---|---|
| Spectral Characteristics: | |
| Spectral Range: | 446–905 nm |
| Spectral Bands: | 240 |
| Spectral Resolutions: | better than 2.5 nm |
| Smile and Keystone: | <±2.5 nm |
| Spatial Characteristics: | |
| Imaging Slit Width: | 25 μm |
| Pixel Pitch Along the Slit | 11.6 μm |
| Swath Width: | 752 pixel |
| Signal Characteristics: | |
| S/N Ratio: | 60 dB |
| Digitization: | 10 bits |

TABLE 1-continued

| Operation mode: | Pushbroom Scanning |
|---|---|
| Shutter: | 1/100 to 1/1,000 sec. Adjustable |
| Scanning Rates: | 60, 30, 20, 15, 12, and 10 scans/sec |
| Fore optics: | |
| Lens Focal Length: | 16 mm, 25 mm, and 50 mm |
| Lens Mount: | C-mount, interchangeable |
| Numerical Aperture: | F/2.8 |
| Physical: | |
| Dimension: | 187 × 70 × 60 mm (without lens; a typical c-mount lens adds another 25 mm to the length) |
| Weight: | 2 lbs. |
| Power: | 12 VDC (±10%), 2.1 W |
| Environmental: | |
| Operating Temperature: | −5° C. to +45° C. |
| Storage Temperature: | −30° C. to +60° C. |

The CCD digital camera 12 is embodied by Model D1 manufactured by Nikon of Tokyo, Japan. The CCD sensor of the digital camera 12 comprises a 2012×1324 pixel format of 11.78 μm×11.78 μm square sized pixels. The specifications for the D1 Nikon camera 12 are listed in Table 2.

TABLE 2

| Operating Mode: | Framing Snapshot Sequence |
|---|---|
| Imaging Characteristics: | |
| Image Sensor Size: | 23.7 × 15.6 mm |
| Pixels Format: | 2,012 × 1,324 Pixels |
| Digitization: | 12-bit per RGB |
| Shutter Speed: | 30 1/16,000 sec. |
| Lens Mount: | Nikon F Mount |
| Current Lens Options: | 24 mm, 35 mm, 50 mm |
| Interface: | IEEE 1394 Interface and 10-pin Remote Terminal |
| Camera Body Physical Characteristics: | |
| Dimensions: | Approx. 157 (W) × 153 (H) × 86 (D) mm (6.2 × 6.1 × 3.4 in.) |
| Weight: | Approx. 1.1 kg (2.5 lbs.) |
| Power: | 9 V DC, 5 A maximum |
| Operating Environment: | |
| Temperature: | 0–40° C. (32–104° F.) |
| Humidity: | Less than 85% (no condensation) |

Figure 4:
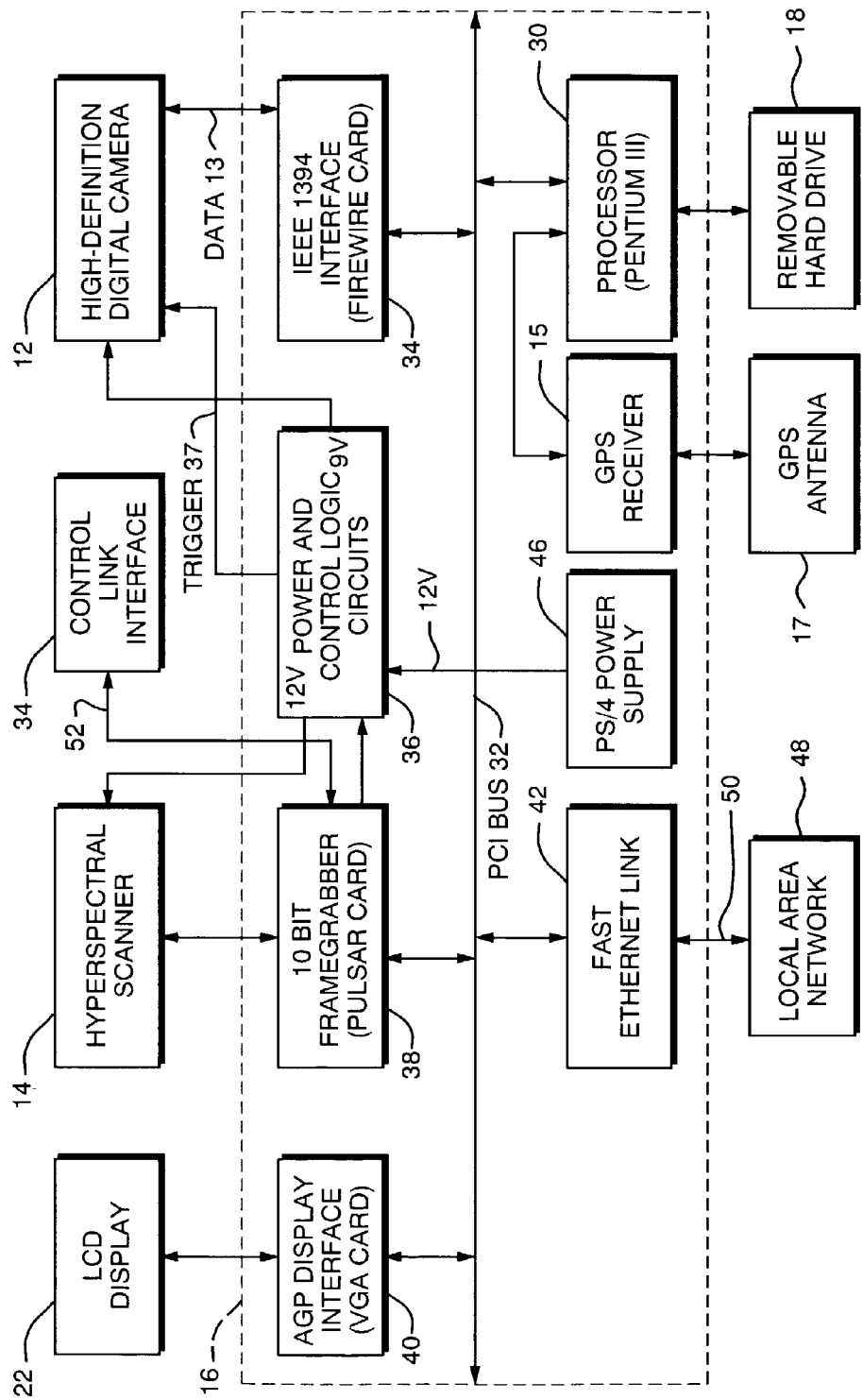
FIG. 4 is a block diagram of the HDHIS computer.

Referring to FIG. 4, a block diagram of the HDHIS computer 16 is shown, including interfacing cards and other equipment, comprising a processor 30 which is embodied by an INTEL Pentium® III coppermine 800 MHz processor and 512 MB of SDRAM based motherboard with a PCI interface bus 32 and a removable hard drive 18. The HDHIS computer 16 comprises a GPS receiver 15 (coupled to a GPS antenna 17) which connects to the processor (or CPU board) 30. The GPS receiver provides real time measurement of the geodetic position of the HDHIS 10, and may be embodied by Model M12 ONCORE, manufactured by Motorola of Arlington Heights, Ill. Also connected to the bus 32 are the following: IEEE 1394 Firewire interface card for interfacing with the digital camera 12, 200 WPS/4 standard power supply 46, power and control circuits 36, 10 bit framegrabber (Pulsar card) 38 for interfacing with the hyperspectral scanner 14 and providing a control link 34 for interfacing with a CAMIS computer 86 (FIG. 6), AGP display (VGA Card) 40 for interfacing with the LCD Display 22, and fast Ethernet link 42 for interfacing with local area network 48. The 10 bit framegrabber 38 may be embodied by model Pulsar, manufactured by Matrox Graphics Inc. of Quebec, Canada. The processor 30 interfaces with the removable hard drive 18 which has a storage capacity up to 120 Gbytes today and may be embodied by model WD 11200JB manufactured by Western Digital of Lake Forest, Calif. The AGP display interface (VGA Card) 40 may be embodied by model Millennium G450, manufactured by Matrox Graphics Inc. of Quebec, Canada. The IEEE 1394 Firewire interface card 34 may be embodied by model K01PC 1394A, manufactured by Maxtor Corporation of Milpitas, Calif. The HDHIS computer 16 is hosted on an ASUS CUSL2-M, Intel 815E chip set motherboard made by ASUStek of Taiwan in a micro-ATX form factor case which is embodied by model IW-D500, manufactured by Inwin, Inc. of Taiwan.

Figure 5:
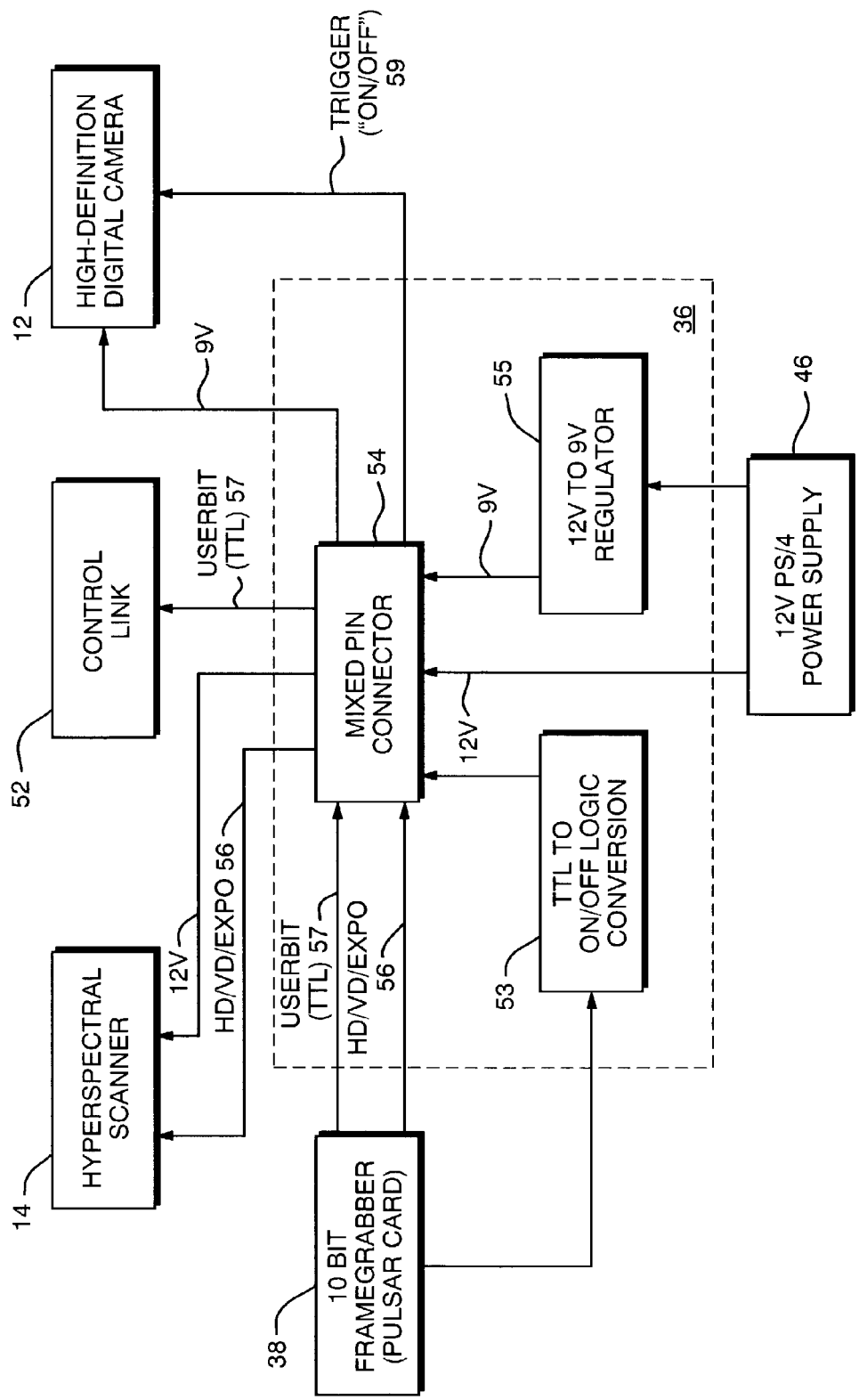
FIG. 5 is a block diagram of the power and control logic circuits of the HDHIS computer.

Referring to FIG. 5, a block diagram is shown of the power and control logic circuits 36 which provide 9 volts for the digital camera 12, provides 12 volts for the hyperspectral scanner 14, and provides synchronization and exposure control for the hyperspectral scanner 14 and the (HD) digital camera 12. There are no other power sources attached to the hyperspectral scanner 14 and the HD digital camera 12. The power and control logic circuits 36 comprise a 12V to 9V regulator 55, a TTL to "ON/OFF" logic conversion circuit 53 and a mixed pin connector 54. The 12V to 9V regulator converts a 12 V power input from the 12V power supply 46 to a 9V output for the HD digital camera 12. The 12V power supply is embodied by a standard 200 watt PS/4 computer power supply for a micro ATX format chassis. The TTL to "ON/OFF" logic conversion circuits 53 convert the USERBIT TTL 57 trigger signals provided by a programmable matrix pulsar card 38 USERBIT port to the "ON/OFF" (or close/open) trigger signal 59 required by the HD digital camera 12. The mixed pin connector 54 provides connections for all the Horizontal Drive (HD)/Vertical Drive (VD)/ TTL pulse width exposure control (EXPO) signal 56 wires, and provides a 12V power wire for the hyperspectral scanner 14, the USERBIT TTL signal 57 wire for the control link 52, and for the 9V power wire and the trigger signal 59 wire to the HD digital camera 12 from the sources of the PS/4 power supply 46, the USERBIT output port of the 10 bit framegrabber Pulsar card 38, the TTL to "ON/OFF" logic conversion circuits 53, and the 12V to 9V regulator 55 respectively.

Referring again to FIG. 1, the heaviest data stream of the HDHIS 10 is the hyperspectral scanner (imaging spectrometer) 14 data stream. The raw data stream, consisting of 240 bands of 752 pixels of 10 bit uncompressed data for each of pushbroom scan lines, is sent to the memory of the HDHIS computer 16 at 60 scan lines per second, which equals 21,657,600 Bytes/sec. Considering 14% overhead is needed for line and frame blanking period etc., the raw bandwidth of the HDHIS computer 16 required to deal with the front-end video stream is 25,183,225 Bytes/sec or 25 Mbytes/sec. With the latest personal computer, like the HDHIS computer 16, this data stream is buffered.

A special real-time memory burst recording algorithm is provided in the HDHIS computer 16 which is true real-time and very reliable, but requires huge memory space. With 512 MB system memory in the HDHIS computer 16 (384 MB reserved for hyperspectral data), it only gives maximum recording length of 1050 scan lines (35 seconds at 30 scans per second). In remote sensing applications of the HDHIS such as for forest, coastal area, etc. applications, a more capable recording technology is required to record a large format data set to a mass storage device.

The mass storage device selected for such applications is the large capacity computer hard drive 18 (40 GB or better). Some hard drive vendors claim that their latest hard drives have a maximum transfer rate of about 50 MB/sec. However, tests show that this number is no more than some short time reading speed. The hard drive 18 recording speed irregularity and especially its glitches (which is believed to result from the operating system needs for diverse disk cache data flushes and background services, resource management needs for extra disk accesses, etc.) causes frame drop or scan line loss. Even though such frame drop caused by glitches is sometimes no more than 1% of total data, this is not good enough for this HDHIS 10 system.

Figure 6:
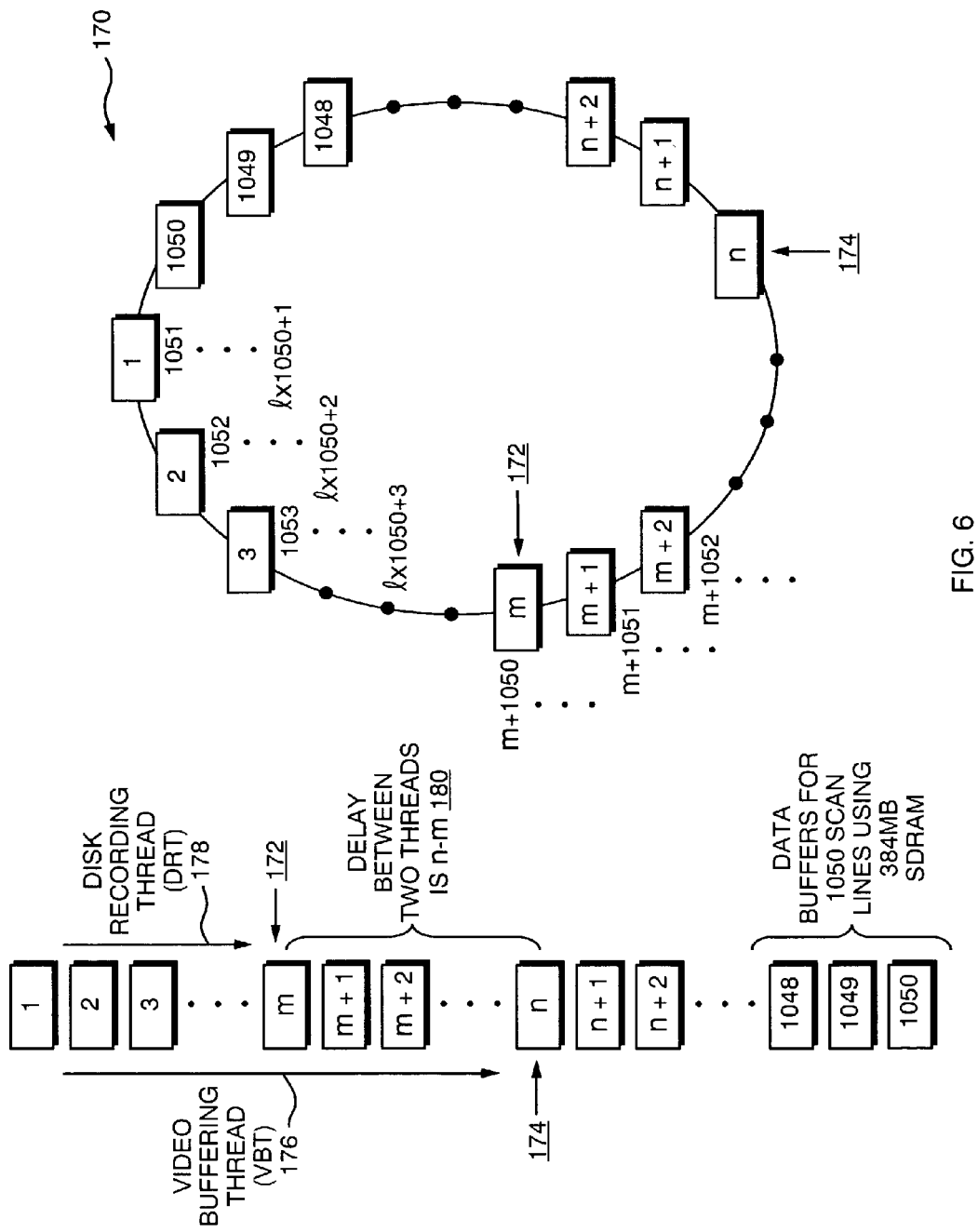
FIG. 6 is a pictorial view of a ring buffer recording algorithm according to the present invention.

Referring again to FIG. 4 and also FIG. 6, FIG. 6 shows a pictorial view of a hard-drive-based, memory-buffering assisted ring buffer recording algorithm which is provided for the HDHIS computer 16. The ring buffer 170 is actually mapped from a linear, physical, memory space of the system SDRAM and configured as a ring using software defines. The hyperspectral scanner 14 can send data blocks for 1050 scan lines to the linear memory space (384 MB) without erasing anything. After that it always erases the oldest data by replacing the oldest with current data, one by one along with continuous buffer logical number increase as indicated on the ring buffer 170. A disk recording thread (DRT) 178 works in parallel with the video buffering thread (VBT 176), which is set as the top priority using interrupts and DMA techniques, so that there will be no glitches for the HDHIS computer 16. A pointer 172 for the disk recording thread 178 and a pointer 174 for the video buffering thread 174 access the SDRAM buffers 170 as a ring. The DRT 178 fetches data from the ring buffer 170 in a first-in-first-out (FIFO) mode. Even though there will be certain glitches-associated slowdown in DRT, depending on the system configuration, the hard drive performance, and the scanning rate, the data can be recorded to hard drive 18 much longer with certain delay $[(n+l)-(m+l)]=(n-m)$ 180, but without data loss, until the total delay catches up with ring-buffer physical length (1050 in this embodiment), where $l=1,2,3 \ldots$ (which is the ring counter that counts the number of rings that are run).

Using the ring-buffer assisted disk recording technology, the completed imaging spectrometer raw data set, with all 240 bands uncompressed at 752 pixel swath and 10 bit digitization, can be sent to the hard drive 18 at up to 60 scan lines per second without frame drop or data loss. It extends the maximum recording length of the current system from 1050 scanning lines to more than 7000 lines at 60 scan/sec rate (using two 80 GB Maxtor D740 XL hard drives) and more than several tens of thousands of lines for 30 scans/sec or slower. More system memory and future fast hard drives will definitely extend the recording performance, but the current capacity allows for "large area" remote sensing.

Figure 7:
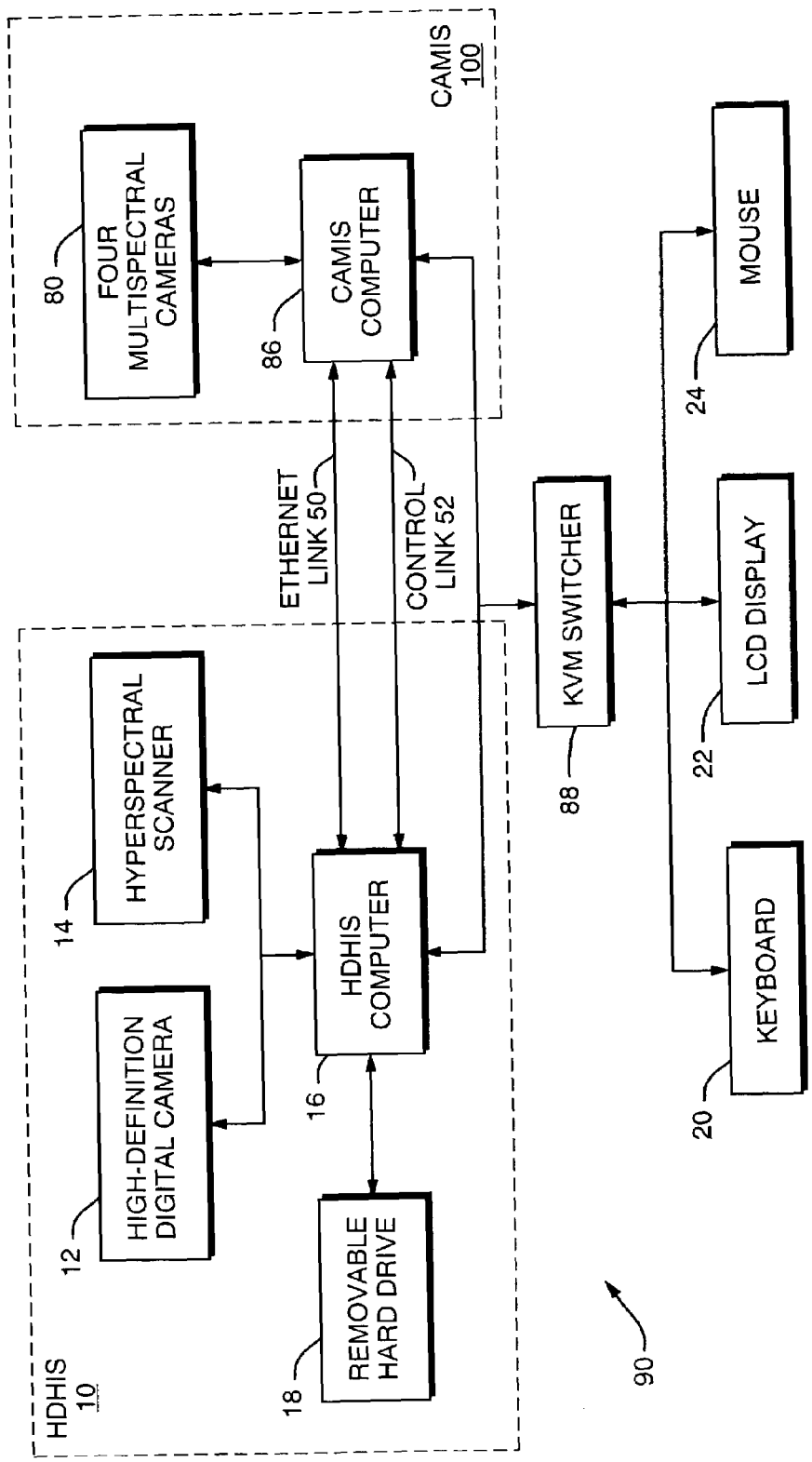
FIG. 7 is a system block diagram of a High-Definition Hyperspectral Imaging System (HDHIS) combined with a Computerized Airborne Multi-Camera Imaging System (CAMIS) according to the present invention.

Referring now to FIG. 7, a system block diagram of the HDHIS 10 combined with a computerized airborne Multi-Camera Imaging System (CAMIS) 100 is shown according to the present invention which provides a triple spectral imaging system that can be operated by one person in light aircraft 60. The HDHIS/CAMIS combo 90 provides all the advantages of a grating based hyperspectral pushbroom scanner 14, a framing-type four-band multispectral camera 80 and a high-spatial definition digital camera into a single system which is suitable for deployment in the light aircraft 60.

Still referring to FIG. 7, CAMIS 100 includes four progressive scan CCD imagers or cameras 80 with 768 by 572 pixels each including a set of interchangeable interference filters which include a 10 nm bandwidth set centered at 450, 550, 650 and 800 nm respectively. The multispectral cameras 80 interface with the CAMIS computer 86. The CAMIS computer 86 communicates with the HDHIS computer 16 via the Ethernet link 50. The control link 52 provides for the real time starting and stopping of the HDHIS 10 as described above in accordance with control signals from the CAMIS computer 86. A keyboard, video, mouse (KVM) switcher 88 commonly known in the art interfaces a single set of a keyboard 30, LCD display 22 and a mouse 24 to the HDHIS computer 16 and the CAMIS computer 86 which enables the HDHIS/CAMIS combo 90 to be under the control of a single operator.

Figure 8:
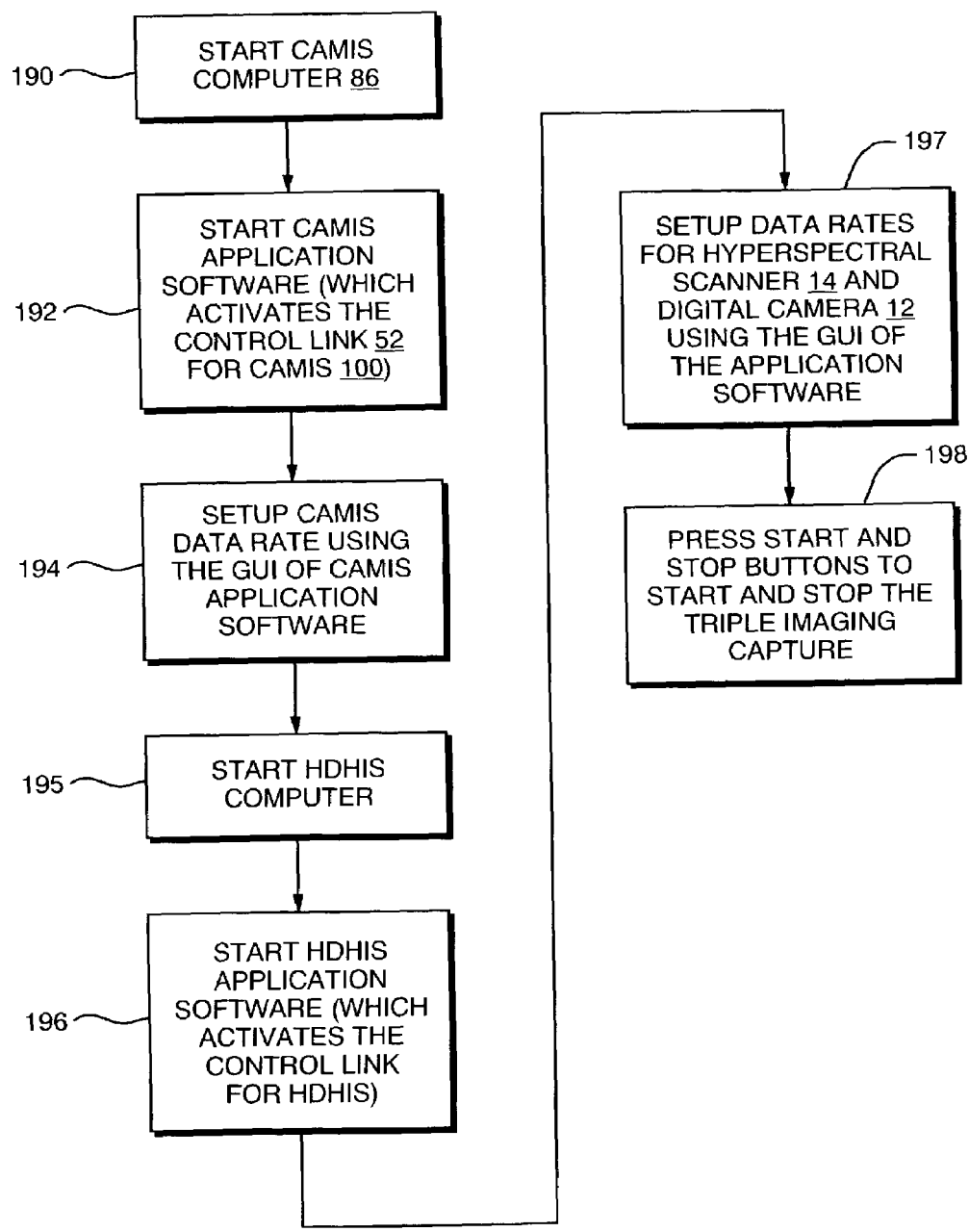
FIG. 8 is a flow chart of a software routine for enabling a single instrument operator to control the HDHIS/CAMIS Combo imaging computers.

Referring to FIG. 8, a flow chart is shown of the steps for triple-imaging data collection using the HDHIS/CAMIS 90 under the control of a single operator. At entry block 190, the CAMIS computer 86 is started by an operator. At block 192 CAMIS application software is initiated which activates the control link 52 for CAMIS 100. At block 194 the CAMIS 100 data rate is setup using a graphical user interface (GUI) 200 of CAMIS 100 application software. At block 195 the HDHIS computer 16 is started, and at block 196 HDHIS application software is started which activates the control link 52 at the HDHIS computer 16. At block 197 the data rates are setup for the hyperspectral scanner 14 and the HD digital camera 12 using the GUI of the application software. Finally, at block 198 start and stop buttons are pressed on the keyboard 20 to start and stop the triple imaging capture by the combination HDHIS 10 and CAMIS 100 as shown in FIG. 7.

Figure 9:
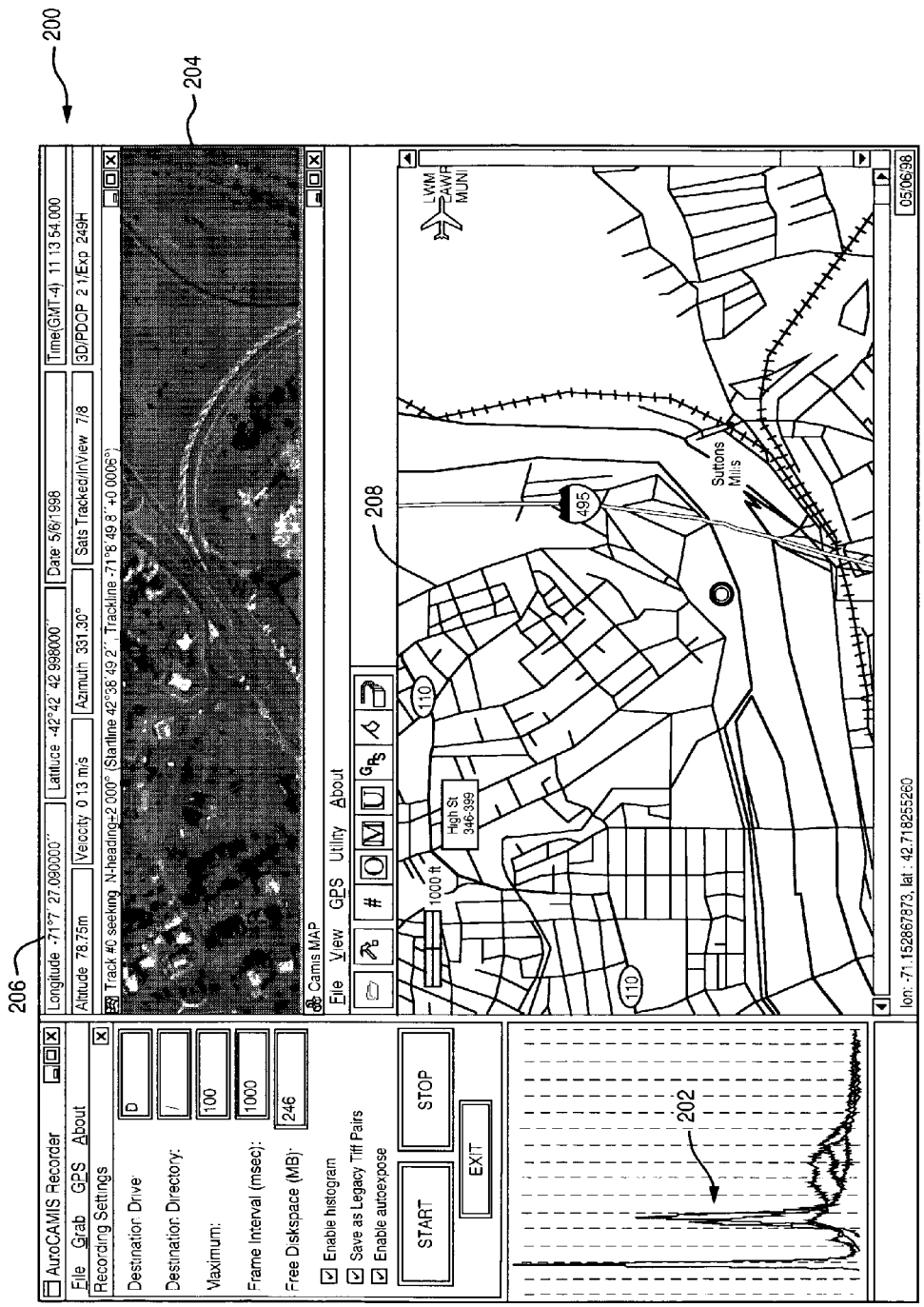
FIG. 9 shows a graphical user interface for operating CAMIS.
Figure 10:
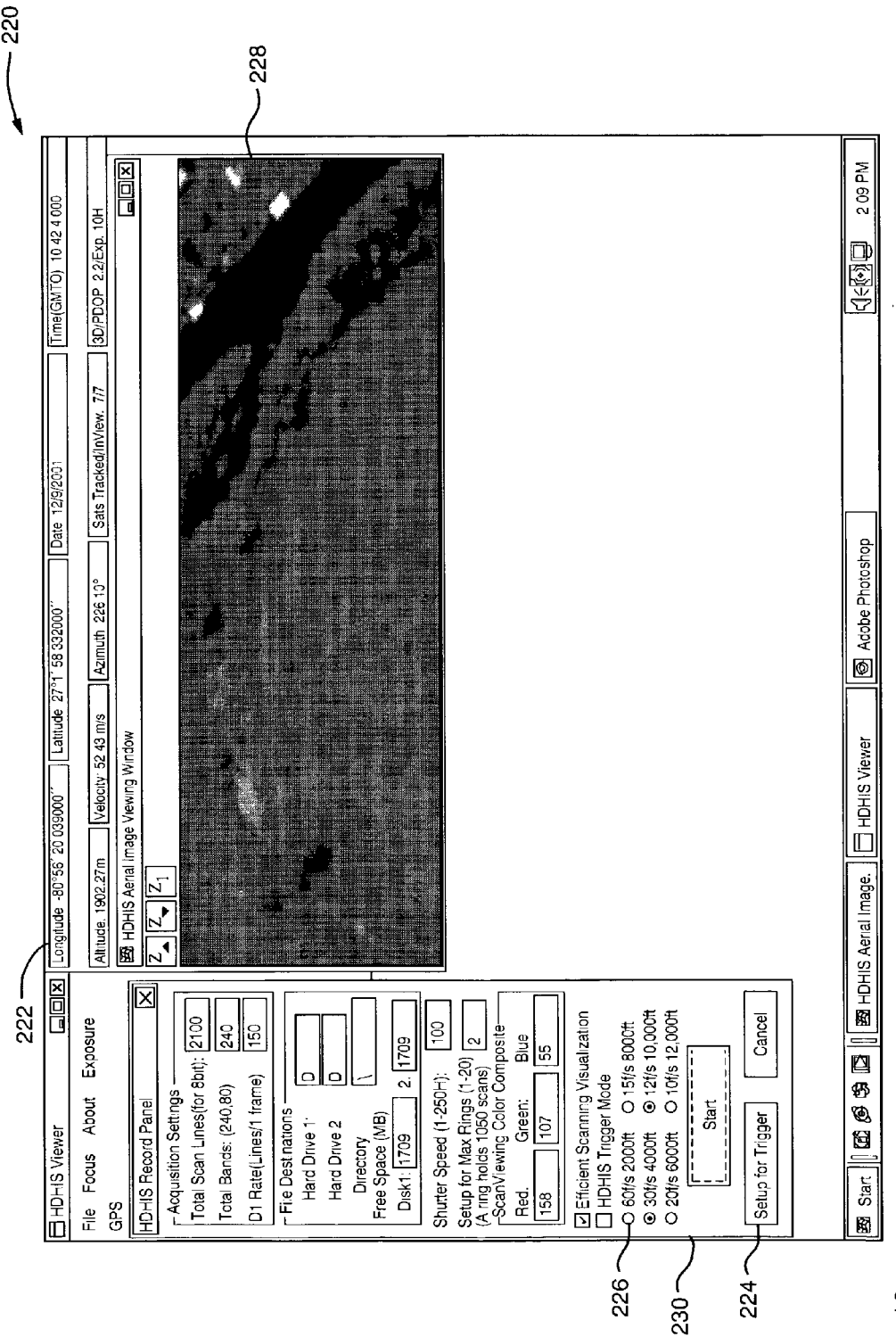
FIG. 10 shows a graphical user interface for operating the HDHIS.

Referring to FIG. 9 and FIG. 10, FIG. 9 shows the graphical user interface 200 when operating the CAMIS 100 including a histogram 202 real time imaging window 204, GPS measurement update 206 and a moving map 208. FIG. 10 shows the graphical user interface 220 when operating the HDHIS 10. The operator can see the real time pushbroom image 228 and the real time GPS measurement update 222. When HDHIS 10 is used with CAMIS 100 as a slave node, the operator only needs to click the setup for trigger button 224 in the bottom left of the dialog box 230. When the HDHIS 10 data acquisition application software is running, the HDHIS computer 16 always checks the imaging running flag of CAMIS via the control link 52. When CAMIS 100 is ON, HDHIS 10 follows ON in less than 1/60 second. When CAMIS 100 is OFF, HDHIS 10 follows OFF in less than 1/60 second. To set HDHIS 10 to work correctly, the operator sets the HD digital camera 12 rate (digital camera snapshot period for how many hyperspectral scanner 14 scan lines). There are six hyperspectral scanner 14 rate choices (60 f/s, 30 f/s, . . . , 10 f/s, see the bottom left dialog box 230). The operator also sets the shutter speed of the hyperspectral scanner 14.

Figure 11:
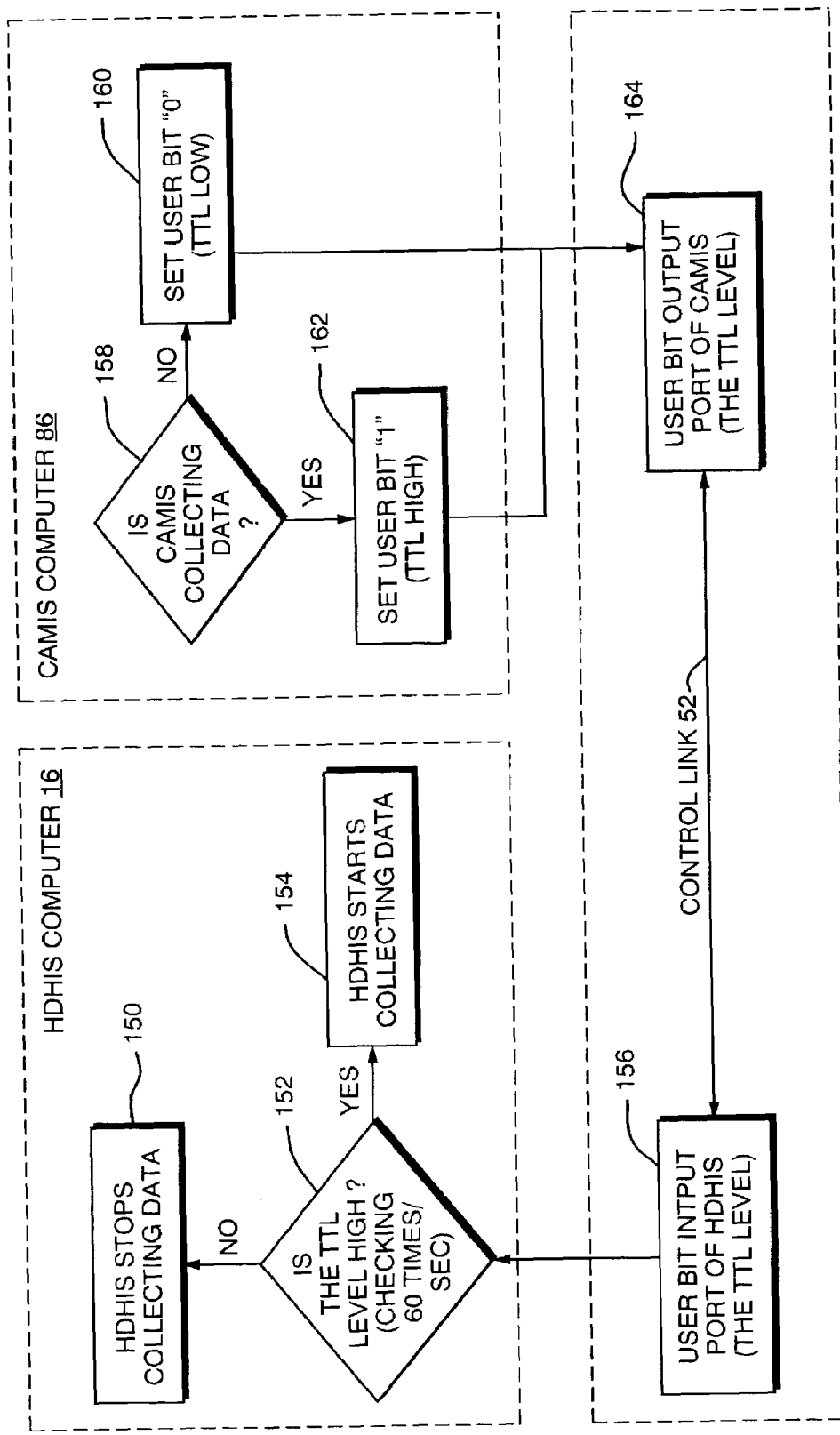
FIG. 11 is a block diagram flow chart for the control link function in the HDHIS/CAMIS combination according to the present invention.

Referring to FIG. 7 and FIG. 11, FIG. 11 is a flow chart showing the operational steps for the control link 52 routine of the HDHIS/CAMIS combo 90 of FIG. 7. The control link 52 comprises a pair of shielded wires for TTL signals between a digital port of Pulsar Card 38 in the HDHIS computer 16 and a digital port of a Genesis Card in CAMIS 100. The CAMIS computer 86 is programmed to check if CAMIS 100 is collecting data (see block 158). If it is not collecting data, the USER BIT is set to "0" (TTL Low) at block 160. If the CAMIS 100 is collecting data, the USER BIT is set to "1" (TTL High) at block 162. In the HDHIS computer 16 the USER BIT is received at block 156 and the TTL Level of the control link 52 is checked via programming block 152 for being HIGH and it is checked at a rate of 60 times/sec. If the USER BIT is HIGH, HDHIS starts collecting data (see block 154). If the USER BIT is LOW based on the check performed in the programming box 152, HDHIS stops collecting data (see block 150). In summary, the control link 52 software routine continuously checks the control link 52 status at 60 times/sec. If the level of the control link 52 is TTL HIGH, indicating that CAMIS 100 is collecting date, HDHIS 10 is activated to collect data. If the level of the control link 52 is TTL LOW, when CAMIS 100 is finished collecting data or sleeping, then HDHIS stops collecting data. In this way, when CAMIS 100 is switched ON and OFF, the HDHIS 10 is synchronized to be similarly ON and OFF.

The HDHIS 10 acquires hyperspectral scanner data and HD digital camera data at a fast speed of 22 MB/sec maximum, and it directly stores such data on the removable hard drive 18. The CAMIS 100 acquires multispectral images directly to its internal hard drive 102 and then transfers such images to the removable hard drive 18 of the HDHIS 10 via the Ethernet data link 50 during, for example, aircraft 60 (FIG. 2) turn around time or after landing. In a flight application, the aircraft turn around time is generally needed for aircraft turning and aligning for another flight line. By transferring CAMIS data to the removable drive 18 during turn around time, all the data is ready for delivery upon landing.

Figure 12:
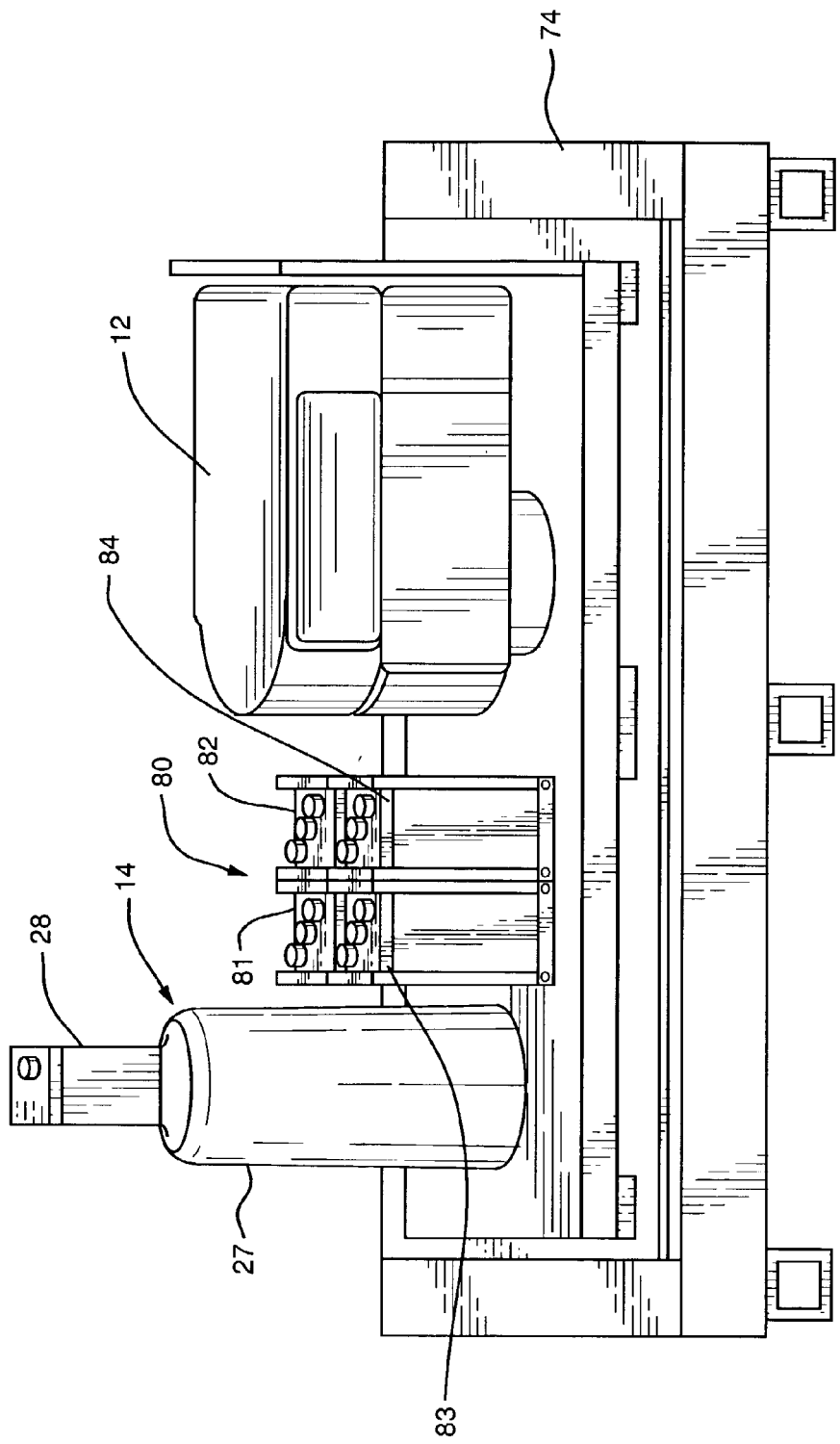
FIG. 12 is a rear perspective view of an HDHIS/CAMIS combination sensor package showing arrangement of a hyperspectral scanner, four multi-spectral cameras and a digital photograph camera.
Figure 13:
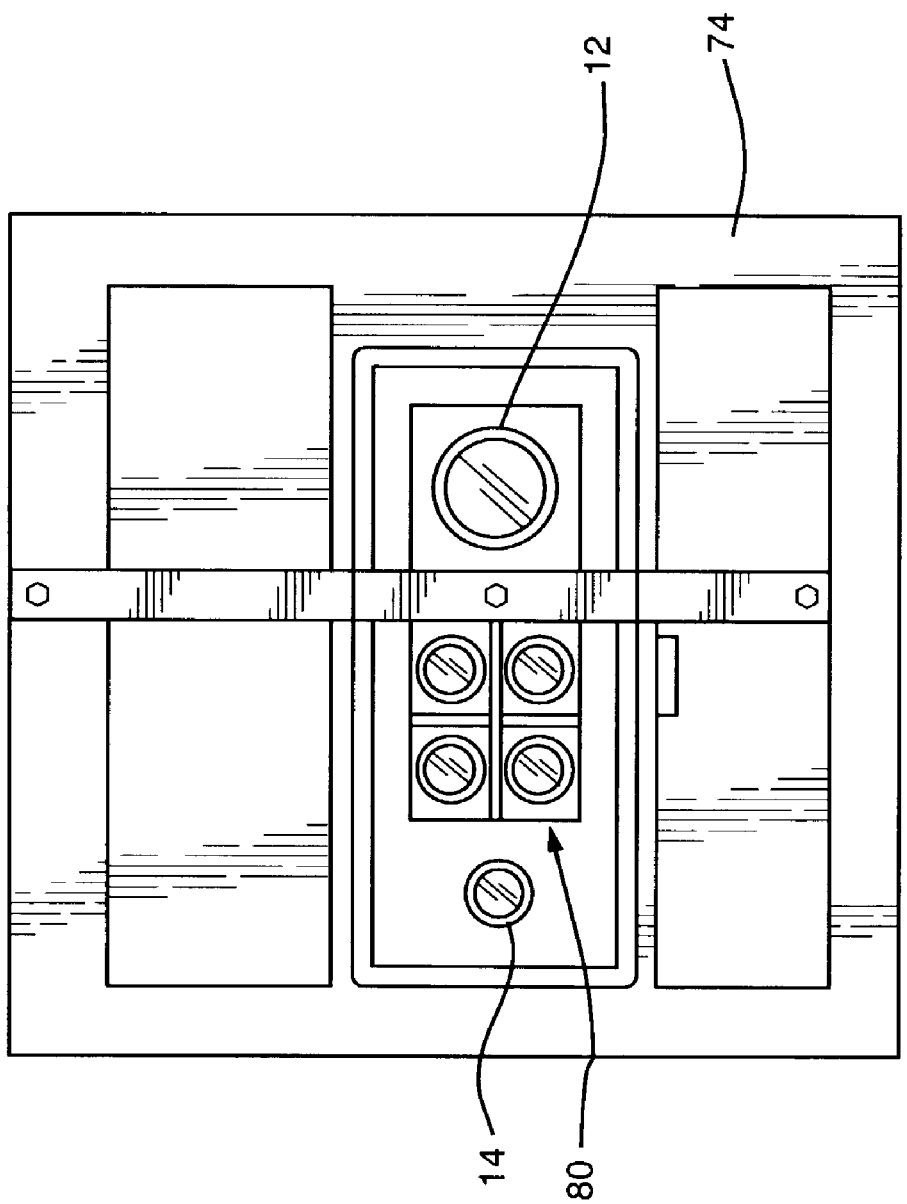
FIG. 13 is a front elevational view of the HDHIS/CAMIS combo sensing package of FIG. 12.

Referring now to FIGS. 12 and 13, FIG. 12 is a rear perspective view of the sensors of the HDHIS/CAMIS combo 90 comprising the hyperspectral scanner 14, the four progressive scan CCD cameras 81, 82, 83, 84 and the digital camera 12 mounted in a panel 74 which is secured to the floor of the aircraft 60 (FIG. 2) during airborne operation. FIG. 13 is a front elevational view of the sensors of HDHIS/CAMIS combo 90 mounted in the frame 74 which connects to the floor of the aircraft 60 for viewing the landscape seen from the aircraft 60.

Figure 14:
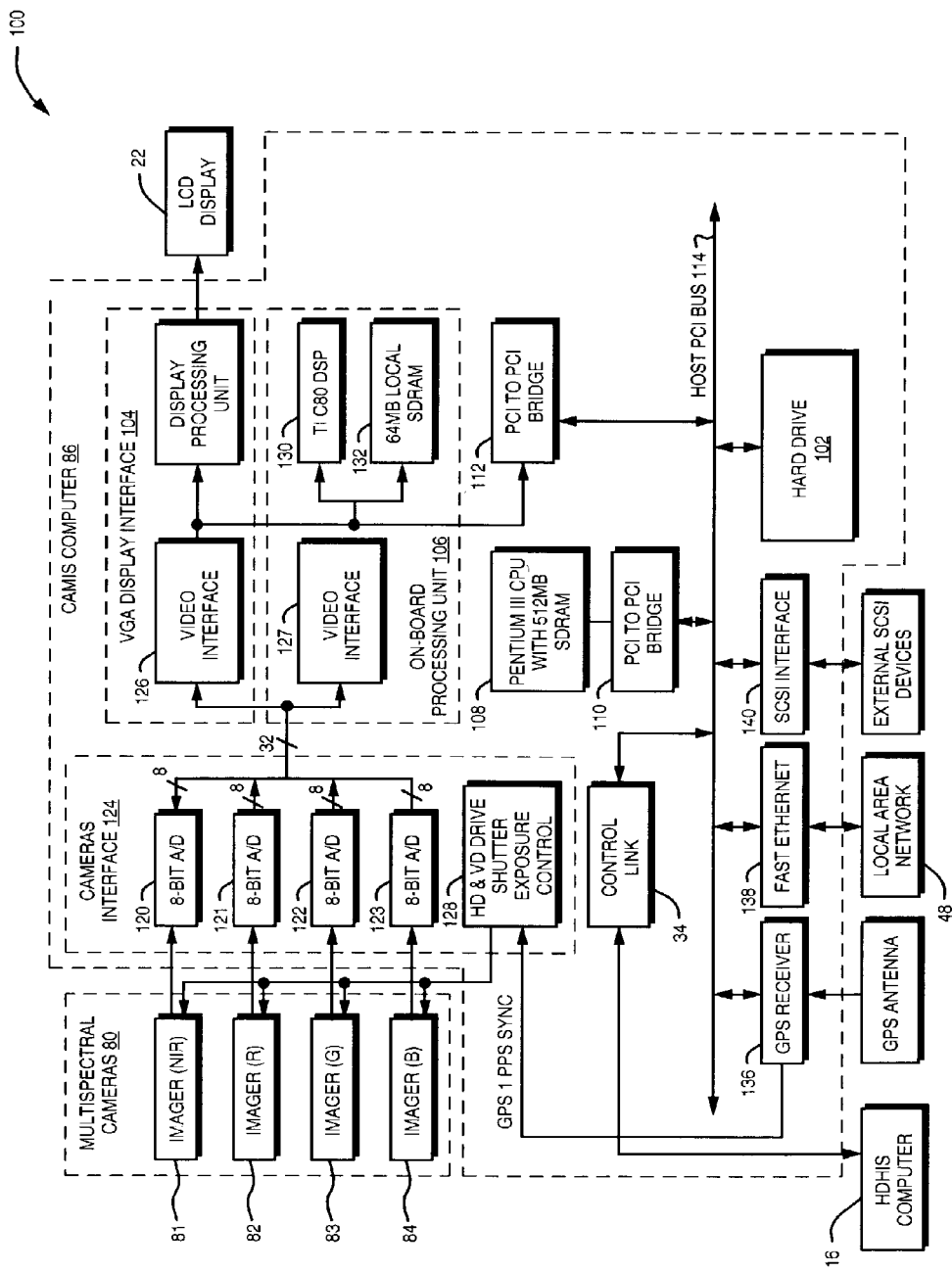
FIG. 14 is a block diagram of the CAMIS system.

Referring to FIG. 14, a block diagram is shown of the CAMIS 100 comprising four multispectral images or cameras 80, and a CAMIS computer 86. The multispectral cameras 80 comprise four synchronized Sony XC-8500CE ½" black-and-white progressive scan CCD video imagers or cameras 81, 82, 83, 84, with 782×576 effective square pixels each. By attaching interchangeable narrow band interference filters to the front of the lens of each of the cameras 81, 82, 83, 84, four user-selectable spectral bands within the 400–1000 nm spectral range, such as blue, green, red, and near infrared (NIR) at 450, 550, 650, and 800 nm respectively with bandwidth 10 nm or 25 nm each, can be captured with non-compromised color separation. The Sony XC-8500CE camera was designed for optimum performance in a motion environment. Using interline transfer progressive scan technology with a controllable electronic shutter, all pixels of a XC-8500CE camera are exposed to light exactly the same amount of time and transferred to vertical shift registers quickly and simultaneously for minimized smear. The camera provides accurate and clear images for capturing objects moving at high speeds.

The CAMIS computer 86 includes a camera interface 124 which comprises four 8-bit A/D converters 120, 121, 122, 123 for digitizing the multispectral image data from the multispectral cameras 81–84 respectively. The camera interface 124 also comprises an HD & VD shutter exposure control 128 for varying the shutter speed of the multispectral cameras 81–84. The digitized image data is fed to a VGA display interface 104 for display on the LCD display 22, and the digitized image data is fed to a processing unit 106. The multispectral bands of images are stored in local SDRAM 132 during various processing operations. The processing unit 106 comprises a TI C80 digital signal processor (DSP), and the DSP 130 is connected to a host PCI (Peripheral Component Interconnect) bus 114 via a PCI to PCI bridge 112. Data transfers occur via the PCI bus 114. An INTEL Pentium III 800 MHz CPU 108 with 512 MB SDRAM is provided for performing data processing and supervisory control, and a PCI to PCI bridge 110 interfaces the Pentium III CPU 108 to the PCI bus 114.

The CAMIS computer 86 also includes a Matrox Genesis image processing card with 64 MB local SDRAM 132, a differential GPS receiver 136, a 40 GByte hard drive 102, fast Ethernet 138 packaged into a compact computer chassis, which is approximately half a standard desktop PC in size and weighing less than 20 pounds. It has a power consumption of less than 150 W running under Windows NT 4.0 or higher. The CAMIS computer 86 powers and synchronizes the four multispectral cameras 81–84 and digitizes the four-channel video data stream simultaneously for snapshot imaging. The multispectral cameras 81–84 are packaged as a rugged, pocket-sized remote sensor head 80 (FIG. 12), which is small enough to be fitted at any convenient location of an aerial platform. The Matrox processing card and related software with 64 MB SDRAM 132, the 8-bit A/D converters 120–123, and the video interfaces 126, 127 are manufactured by Matrox Electronic Systems, Ltd. of Dorval, Quebec, Canada.

The CAMIS 100 is further described in the paper by Xiuhong Sun, James Baker and Richard Hordon entitled "Computerized Airborne Multicamera Imaging System (CAMIS) and Its Four-Camera Application", Third International Airborne Remote Sensing Conference and Exhibition, 7–10 Jul. 1997, Copenhagen, Denmark, and in U.S. Patent Publication No. US2002/0012071-A1 entitled "A Multispectral Imaging System With Spatial Resolution Enhancement", filed Apr. 19, 2001 by Xiuhong Sun, published Jan. 31, 2002, and assigned to the present Assignee, both of which are incorporated herein by reference.

The HDHIS/CAMIS combo 90 provides many advantages which have been demonstrated. For example, immediate and fast retrievable aerial imagery data sets are provided. The HD digital camera 12 can be configured with a wide field of view and needs the minimum number of frames for a large area image mosaic. Therefore, a fast digital color image overview can reach the decision maker's hands in a relatively short time, allowing on-site decision-making regarding coverage and image quality. Quick view color composite is available from the hyperspectral data. Pushbroom-scanned color composite images (non-geo-corrected, composed of three bands in either natural color or false NIR from the hyperspectral data cube), can be available for a given 25 mile long flight line immediately after data acquisition. The digital camera photos can be relatively easily orthorectified and mosaiced, so that they can be used as a large format georeference for all the rest of the data set. High quality multispectral mosaiced images with better color separation, better spectral information contents, and better physical resolution than the digital camera images (digital camera nominal resolution is defined after data interpolation) can be available just after the digital camera photo mosaic.

Further, information rich spectral imaging data sets are provided for extensive data explorations. The hyperspectral data cube and the multispectral snapshots can be extensively exploited for scientific research and advanced application development. For example, the HDHIS/CAMIS combo data sets can be used to measure forest area moisture content, so that the likelihood of forest fires could be forecast, to judge the efficiency of burning brush undergrowth and monitoring fires; and to judge land and water pollution in mining areas. Both multispectral and hyperspectral, especially the hyperspectral, can be used as a research tool for moisture content measurement, which is an important index for forest fire forecast. Hyperspectral data is the preferred tool for mining area environment monitoring and management where mineral pollutants on land and water are concerned. Quick view color composites from the hyperspectral data, and fast deliverable digital camera mosaics can be used for near real-time fire detection and monitoring. Multispectral false-color images (NIR false color composite) are preferred for the burning effect evaluation, after the fires are out. Extensive processed hyperspectral data will allow pixel spectral analysis of an area of interest; this could result in species determination or species encroachment maps.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. An imaging system comprising:
   means for providing hyperspectral images of a target area;
   means, positioned adjacent to said hyperspectral images providing means, for providing photographic images of said target area; and
   means for processing said images from said hyperspectral images providing means and said photographic images providing means to produce optimized spatial and spectral aerial images of said target area.

2. The imaging system as recited in claim 1 wherein said means for providing hyperspectral images comprises a hyperspectral scanner for acquiring images of said target area line after line as a pushbroom-sequence.

3. The imaging system as recited in claim 2 wherein said hyperspectral scanner comprises:
   a spectrograph;
   a lens attached to an input of said spectrograph; and
   a CCD camera attached to an output of said spectrograph.

4. The imaging system as recited in claim 1 wherein said means for processing said images comprises a computer coupled to a removable hard drive.

5. The imaging system as recited in claim 4 wherein said computer comprises means for providing power and control with optimized wiring to said hyperspectral images providing means and to said photographic images providing means.

6. The imaging system as recited in claim 4 wherein said computer provides said hyperspectral images and said photographic images to said removable hard drive.

7. The imaging system as recited in claim 6 wherein said computer comprises means for ring buffering data of said hyperspectral images and transferring said data to said removable hard drive.

8. The imaging system as recited in claim 1 wherein said photographic images providing means comprises a CCD digital camera.

9. An airborne imaging system comprising:
   a hyperspectral scanner;
   a digital camera positioned adjacent to said hyperspectral scanner; and
   means for processing imaging data from said hyperspectral scanner and said digital camera for displaying and storing concurrent hyperspectral images and high resolution photographic images.

10. The airborne imaging system as recited in claim 9 wherein said hyperspectral scanner comprises:
    a spectrograph;
    a lens attached to an input of said spectrograph; and
    a CCD camera attached to an output of said spectrograph.

11. The airborne imaging system as recited in claim 9 wherein said means for processing said imaging data comprises a computer coupled to a removable hard drive.

12. The airborne imaging system as recited in claim 11 wherein said computer comprises means for providing power and control with optimized wiring to said hyperspectral scanner and to said digital camera.

13. The airborne imaging system as recited in claim 11 wherein said computer comprises means for ring buffering data of said hyperspectral images and transferring said data to said removable hard drive.

14. A multi-sensing imaging system comprising:
    means for providing hyperspectral images of a target area;
    means, positioned near and optically parallel to said hyperspectral images providing means, for providing photographic images of said target area;
    means, positioned near and in parallel with said hyperspectral images providing means and said photographic images providing means, for providing multispectral images of said target area; and
    means for processing said images from said hyperspectral images providing means, said photographic images providing means, and said multispectral images providing means.

15. The multi-sensing imaging system as recited in claim 14 wherein said multi-sensing imaging system comprises a removable hard drive for storing said images received from said processing means.

16. The multi-sensing imaging system as recited in claim 14 wherein said means for providing hyperspectral images comprises a hyperspectral scanner for acquiring images of said target area line after line as a pushbroom-sequence.

17. The multi-sensing imaging system as recited in claim 16 wherein said hyperspectral scanner comprises:
    a spectrograph;
    a lens attached to an input of said spectrograph; and
    a CCD camera attached to an output of said spectrograph.

18. The multi-sensing imaging system as recited in claim 14 wherein said photographic images providing means comprises a high-definition CCD digital camera.

19. The multi-sensing system as recited in claim 14 wherein said means for providing said multispectral images comprises four multispectral cameras each including interchangeable interference filters.

20. The multi-sensing imaging system as recited in claim 14 wherein:
    said processing means comprises a first computer for processing images of said target area from said hyperspectral images providing means and said photographic images providing means of said target area; and
    said processing means comprises a second computer for processing images of said target area from said multispectral images providing means.

21. The multi-sensing imaging system as recited in claim 20 wherein said system comprises means connected between said first computer and said second computer for controlling the processing of said images by a single operator.

22. The multi-sensing imaging system as recited in claim 20 wherein said system comprises a removable hard drive connected to said first computer.

23. The multi-sensing imaging system as recited in claim 22 wherein said first computer transfers said hyperspectral images, said photographic images, and said multispectral images via said second computer to said removable hard drive.

24. The multi-sensing imaging system as recited in claim 20 wherein said system comprises a data communication link between said first computer and said second computer for transferring said multispectral images.

25. The multi-sensing system as recited in claim 20 wherein said first computer comprises means for ring buffering data of said hyperspectral images and transferring said data to a removable hard drive.

26. In combination:
a hyperspectral scanner for viewing a target area and providing hyperspectral images;
a digital camera, positioned near and optically parallel to said hyperspectral scanner, for providing photographic images of said target area;
a plurality of multispectral cameras, positioned near and in parallel with said hyperspectral scanner and said digital camera for providing multispectral images of said target area;
a first computer connected to outputs of said hyperspectral scanner and said digital camera for processing said hyperspectral images from said hyperspectral scanner and high-definition photographic images from said digital camera;
a second computer connected to outputs of said multispectral cameras for processing said multispectral images;
a data link connected between said first computer and said second computer for transferring said multispectral images; and
a control link connected between said first computer and said second computer for controlling the collection and processing of said images from said hyperspectral scanner, said digital camera and said multispectral cameras.

27. The combination as recited in claim 26 wherein said combination comprises a removable hard drive coupled to said first computer.

28. The combination as recited in claim 26 wherein said control link enables operation of a multi-imaging system by a single operator.

29. A method of providing an airborne imaging system comprising the steps of:
providing a hyperspectral scanner for generating hyperspectral images;
providing a digital camera positioned adjacent to said hyperspectral scanner for generating high-definition photographic images; and
processing imaging data from said hyperspectral scanner and said digital camera for display and storage of said hyperspectral images and said high-definition photographic images.

30. The method as recited in claim 29 wherein said step of providing a hyperspectral scanner comprises the steps of providing a spectrograph, attaching a lens to an input of said spectrograph, and attaching a CCD camera to an output of said spectrograph.

31. The method as recited in claim 29 wherein said step of processing imaging data from said hyperspectral scanner and said digital camera comprises the step of providing a computer coupled to a removable hard drive.

32. The method as recited in claim 31 wherein said step of providing a computer coupled to a removable hard drive comprises the step of providing means for ring buffering of data from said hyperspectral scanner and transferring said data to said removable hard drive.

33. A method of providing a multi-imaging system comprising the steps of:
providing a hyperspectral scanner for viewing a target area and generating hyperspectral images;
providing a digital camera, positioned near and optically parallel to said hyperspectral scanner, for generating high-definition photographic images of said target area;
providing a plurality of multispectral cameras, positioned near and in parallel with said hyperspectral scanner and said digital camera for generating multispectral images of said target area;
processing said hyperspectral images from said hyperspectral scanner and high-definition photographic images from said digital camera with a first computer connected to outputs of said hyperspectral scanner and said digital camera;
processing said multispectral images with a second computer connected to outputs of said multispectral cameras;
connecting a data link between said first computer and said second computer for transferring said multispectral images; and
connecting a control link between said first computer and said second computer for controlling the collection and processing of said images from said hyperspectral scanner, said digital camera and said multispectral cameras.

34. The method as recited in claim 33 wherein said method comprises the step of providing a removable hard drive coupled to said first computer.

35. The method as recited in claim 33 wherein said step of connecting said control link between said first computer and said second computer includes the step of operating said multi-imaging system by a single operator.

36. The method as recited in claim 33 wherein said step of providing a hyperspectral scanner comprises the step of providing a spectrograph, attaching a lens to an input of said spectrograph, and attaching a CCD camera to an output of said spectrograph.

37. The method as recited in claim 33 wherein said step of providing said first computer comprises the step of providing means for buffering data from said hyperspectral scanner and transferring said data to a removable hard drive.

* * * * *